United States Patent
Martin et al.

(10) Patent No.: US 10,346,057 B1
(45) Date of Patent: Jul. 9, 2019

(54) PROBABILITY-BASED ALLOCATION OF STORAGE FROM STORAGE POOLS

(71) Applicant: EMC IP Holding Company LLC, Hopkinton, MA (US)

(72) Inventors: Owen Martin, Hopedale, MA (US); Mark Moreau, Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 253 days.

(21) Appl. No.: 15/395,122

(22) Filed: Dec. 30, 2016

(51) Int. Cl.
*G06F 3/06* (2006.01)

(52) U.S. Cl.
CPC ............ *G06F 3/0613* (2013.01); *G06F 3/068* (2013.01); *G06F 3/0631* (2013.01)

(58) Field of Classification Search
CPC ....... G06F 3/0613; G06F 3/0631; G06F 3/068
See application file for complete search history.

(56) References Cited

U.S. PATENT DOCUMENTS

| | | | |
|---|---|---|---|
| 8,949,483 B1 | 2/2015 | Martin | |
| 9,612,746 B1 | 4/2017 | Wang et al. | |
| 9,626,116 B1 | 4/2017 | Martin et al. | |
| 9,703,664 B1 | 7/2017 | Alshawabkeh et al. | |
| 2007/0234296 A1* | 10/2007 | Zorn | G06F 11/008 717/124 |
| 2012/0265947 A1* | 10/2012 | Colombo | G06F 9/5016 711/154 |
| 2014/0195640 A1* | 7/2014 | Kaiser | G06F 17/30581 709/217 |
| 2014/0372723 A1* | 12/2014 | Bobroff | G06F 11/3034 711/170 |
| 2016/0132267 A1* | 5/2016 | Kaiser | G06F 17/30581 711/171 |

* cited by examiner

*Primary Examiner* — Charles Rones
*Assistant Examiner* — Hewy H Li
(74) *Attorney, Agent, or Firm* — BainwoodHuang (57) ABSTRACT

A technique allocates storage from a plurality of storage pools of a data storage assembly to host storage. The technique involves receiving an allocation request and, in response to the allocation request, performing a set of probability-based allocation attempt operations that attempts to allocate a storage portion from one of the plurality of storage pools to the host storage. Each storage pool of the plurality of storage pools provides multiple storage portions of physical storage to store host data. The technique further involves, based on a result of the set of probability-based allocation attempt operations, provisioning the host storage with a storage portion from a particular pool of the plurality of storage pools to satisfy the allocation request.

20 Claims, 5 Drawing Sheets

| Pool ID | Characteristics | Std. Rank | Prob. Rank | Diamond | Platinum | Gold | Silver | Bronze | Optimized | Other |
|---|---|---|---|---|---|---|---|---|---|---|
| 001 | Enterprise Flash Drives | 3 | 3 | 1.00 | 0.50 | 0.10 | 0.00 | 0.00 | 1.00 | ... |
| 002 | 10K / 600 GB / RAID1 | 1 | 1 | 0.00 | 0.50 | 0.50 | 0.30 | 0.20 | 1.00 | ... |
| 003 | 10K / 1.2 TB / RAID6 | 2 | 2 | 0.00 | 0.00 | 0.50 | 0.80 | 1.00 | 1.00 | ... |
| 004 | Cloud Storage | 4 | 4 | 0.00 | 0.00 | 0.20 | 0.40 | 1.00 | 1.00 | ... |

| Pool ID | Characteristics | Std. Rank | Prob. Rank | Diamond | Platinum | Gold | Silver | Bronze | Optimized | Other |
|---|---|---|---|---|---|---|---|---|---|---|
| 001 | Enterprise Flash Drives | 3 | 3 | 1.00 | 0.50 | 0.10 | 0.00 | 0.00 | 1.00 | ... |
| 002 | 10K / 600 GB / RAID1 | 1 | 1 | 0.00 | 0.50 | 0.50 | 0.30 | 0.20 | 1.00 | ... |
| 003 | 10K / 1.2 TB / RAID6 | 2 | 2 | 0.00 | 0.00 | 0.50 | 0.80 | 1.00 | 1.00 | ... |
| 004 | Cloud Storage | 4 | 4 | 0.00 | 0.00 | 0.20 | 0.40 | 1.00 | 1.00 | ... |

PROBABILITY-BASED ALLOCATION OF STORAGE FROM STORAGE POOLS

BACKGROUND

A conventional data storage system may form a storage resource pool (SRP) from different data pools (e.g., a group of flash drives, a group of 15K RPM magnetic disks, a group of 10K RPM magnetic disks, etc.). Each data pool provides data devices (e.g., TDATs) for holding host data.

During operation, one or more host computers may write host data to a storage group formed of thin devices (e.g., TDEVs). To satisfy the physical storage needs for a thin device, the conventional data storage system allocates tracks from the data devices of a data pool that forms the SRP until that data pool is completely filled with host data. Once that data pool is completely filled with host data, the conventional data storage system allocates data devices from another data pool that forms the SRP until that data pool is completely filled, and so on.

SUMMARY

Improved techniques involve allocating storage from different storage pools using dynamic probabilities. Here, for each allocation request, data storage circuitry performs a set of probability-based allocation attempt operations that attempt to allocate storage from one of the storage pools. Along these lines, the data storage circuitry assigns each storage pool a probability at runtime. The data storage circuitry then attempts to allocate storage from the storage pools based on the probabilities (e.g., an attempt to allocate storage from a first storage pool based on a first probability value and, if the attempt fails, from a second storage pool based on a second probability value, and so on). Such operation enables more storage pools to participate in allocation thus increasing overall write bandwidth. Moreover, such operation reduces data movement in the long run (e.g., the process of moving host data among the storage pools to maintain performance objectives).

One embodiment is directed to a method of allocating storage from a plurality of storage pools of a data storage assembly to host storage. The method includes receiving an allocation request and, in response to the allocation request, performing a set of probability-based allocation attempt operations that attempts to allocate a storage portion (e.g., a track) from one of the plurality of storage pools to the host storage. Each storage pool of the plurality of storage pools provides multiple storage portions of physical storage to store host data. The method further includes, based on a result of the set of probability-based allocation attempt operations, provisioning the host storage with a storage portion from a particular pool of the plurality of storage pools to satisfy the allocation request.

In some arrangements, performing the set of probability-based allocation attempt operations includes generating an initial random probability value (e.g., a normalized random number), performing an initial comparison operation that compares the initial random probability value to a probability threshold assigned to an initially selected storage pool of the plurality of storage pools, and performing a follow-up activity in response to a result of the initial comparison operation. The follow-up activity (i) includes an attempt to allocate a storage portion from the initially selected storage pool when the result of the initial comparison operation indicates that the initial random probability value is below the probability threshold assigned to the initially selected storage pool, and (ii) does not include an attempt to allocate the storage portion from the initially selected storage pool when the result of the initial comparison operation indicates that the initial random probability value is above the probability threshold assigned to the initially selected storage pool.

In some arrangements, performing the set of probability-based allocation attempt operations further includes, in response to no storage portion being allocated from the initially selected storage pool, generating a second random probability value, performing a second comparison operation that compares the second random probability value to a probability threshold assigned to a second selected storage pool of the plurality of storage pools, and performing a second follow-up activity in response to a result of the second comparison operation. The second follow-up activity (i) includes an attempt to allocate a storage portion from the second selected storage pool when the result of the second comparison operation indicates that the second random probability value is below the probability threshold assigned to the second selected storage pool, and (ii) does not include an attempt to allocate the storage portion from the second selected storage pool when the result of the second comparison operation indicates that the second random probability value is above the probability threshold assigned to the second selected storage pool.

It should be understood that the second random probability value may be generated in response to a failed attempt to allocate a storage portion from the initially selected storage pool. Alternatively, the second random probability value may be generated in response the initial random probability value being above the probability threshold assigned to the initially selected storage pool.

In some arrangements, the method further includes, prior to receiving the allocation request, providing a ranking that ranks the storage pools of plurality of storage pools in a predefined order, the initially selected storage pool being ranked ahead of the second selected storage pool.

In some arrangements, performing the set of probability-based allocation attempt operations further includes, prior to performing the initial comparison operation and based on the ranking, selecting a first storage pool from the plurality of storage pools as the initially selected storage pool and, in response to no storage portion being allocated from the initially selected storage pool and based on the ranking, selecting a second storage pool from the plurality of storage pools as the second selected storage pool. The second storage pool is different from the first storage pool.

In some arrangements, the method further includes, prior to receiving the allocation request, providing a set of probability thresholds. Each probability threshold (e.g., a dynamic probability assigned in real-time) is assigned to a respective storage pool of the plurality of storage pools.

In some arrangements, each random probability value is a number between 0 and 1, inclusive. Additionally, providing the set of probability thresholds includes (i) assigning a first probability threshold between 0 and 1, inclusive, to the initially selected storage pool, and (ii) assigning a second probability threshold between 0 and 1, inclusive, to the second selected storage pool.

In some arrangements, the method further includes routinely updating the set of probability thresholds based on real-time system information. Suitable information includes a service level objective (SLO) selection assigned to the data storage assembly, the SLO selection having been selected from performance-differentiated SLO selections offered by the data storage assembly. Suitable information further includes a storage resource pool (SRP) parameter such as a measure of percentage used of that respective storage pool, or a health state of that respective storage pool (e.g., exceeding performance, meeting performance, missing performance, etc.), or both.

In some situations, no storage portion is allocated after performing the set of probability-based allocation attempt operations. In these situations, the method further includes providing another ranking that ranks the storage pools of plurality of storage pools in another predefined order and, in response to no storage portion is allocated after performing the set of probability-based allocation attempt operations and based on the other ranking, performing a set of non-probability-based allocation attempt operations that attempts to allocate a storage portion from one of the plurality of storage pools to the host storage.

Another embodiment is directed to a data storage assembly (or data storage equipment) that allocates storage from a plurality of storage pools to host storage. The data storage assembly includes a set of physical storage devices that provides a plurality of storage pools, memory, and control circuitry coupled to the memory and the set of physical storage devices. The memory stores instructions which, when carried out by the control circuitry, cause the control circuitry to:

(A) receive an allocation request;
(B) in response to the allocation request, perform a set of probability-based allocation attempt operations that attempts to allocate a storage portion from one of the plurality of storage pools to the host storage, each storage pool of the plurality of storage pools providing multiple storage portions of physical storage to store host data; and
(C) based on a result of the set of probability-based allocation attempt operations, provision the host storage with a storage portion from a particular pool of the plurality of storage pools to satisfy the allocation request.

Yet another embodiment is directed to a computer program product having a non-transitory computer readable medium which stores a set of instructions to allocate storage from a plurality of storage pools to host storage. The set of instructions, when carried out by computerized circuitry, causing the computerized circuitry to perform a method of:

(A) receiving an allocation request;
(B) in response to the allocation request, performing a set of probability-based allocation attempt operations that attempts to allocate a storage portion from one of the plurality of storage pools to the host storage, each storage pool of the plurality of storage pools providing multiple storage portions of physical storage to store host data; and
(C) based on a result of the set of probability-based allocation attempt operations, provisioning the host storage with a storage portion from a particular pool of the plurality of storage pools to satisfy the allocation request.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in probability-based allocation of storage from a plurality of storage pools to host storage.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to allocating storage from different storage pools using dynamic probabilities. Here, for each allocation request, data storage circuitry performs a set of probability-based allocation attempt operations that attempt to allocate storage from one of the storage pools. In particular, the data storage circuitry assigns each storage pool a probability during runtime and updates that probability in an ongoing manner. The data storage circuitry then attempts to allocate storage from the storage pools based on the assigned probabilities. Such operation enables more storage pools to participate in allocation thus increasing write bandwidth. Moreover, such operation reduces data movement in the long run (e.g., the process of moving host data among the storage pools to maintain performance objectives).

Figure 1:
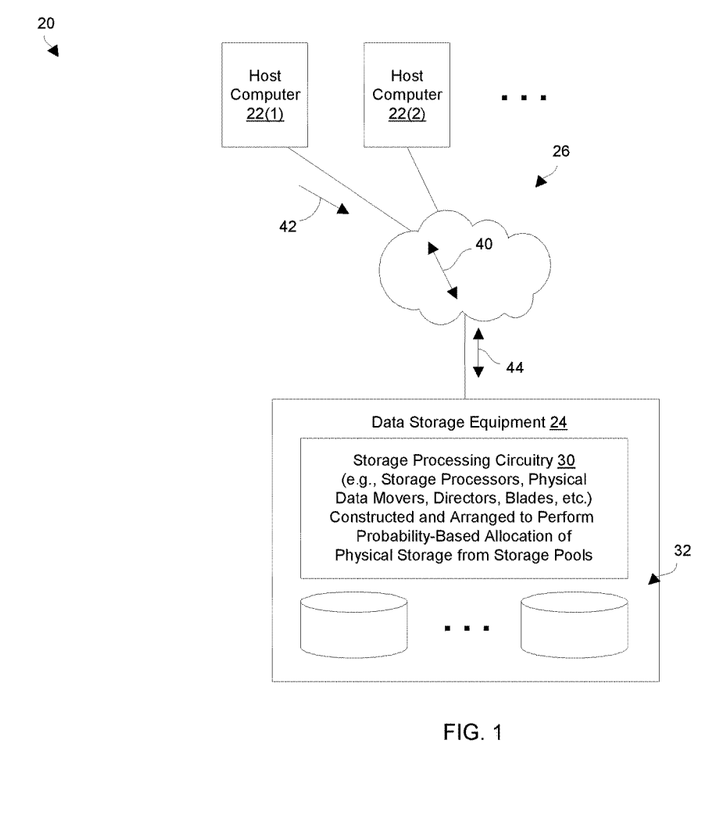
FIG. 1 is a block diagram of a data storage environment which utilizes probability-based allocation of storage from different storage pools.

FIG. 1 shows a data storage environment 20 which utilizes probability-based allocation of storage from different storage pools. The data storage environment 20 includes host computers 22(1), 22(2), . . . (collectively, host computers 22), data storage equipment 24, and a communications medium 26.

Each host computer 22 is constructed and arranged to access host data that is maintained by the data storage equipment 24. Along these lines, the host computers 22 may operate as independent devices, as one or more clusters, or combinations thereof to perform useful work (e.g., to access databases, as webservers, as content servers, as email servers, combinations thereof, etc.).

The data storage equipment 24 is constructed and arranged to store host data on behalf of the host computers 22. The host data may reside in files of file systems, as block-based data within logical units of storage (LUNs) or volumes, volumes within files, file systems within volumes, combinations thereof, and so on. The particular storage techniques that are put in use (e.g., file-based, block-based, etc.) may be application dependent and can be configured by a human operator (or administrator) of the data storage equipment 24.

The data storage equipment 24 includes storage processing circuitry 30 and an array of storage devices 32. The array of storage devices 32 includes groups of different storage media such as flash devices, 15K magnetic disk drives, 10K magnetic disk drives, and so on. Each group forms a separate and distinct storage pool (e.g., a separate storage pool or group). The different storage pools may differ in technology (e.g., flash vs. magnetic disk), drive capacity (e.g., 900 GB, 1.2 TB, etc.), rotation speed if applicable (e.g., 15K vs. 10K), and RAID Level (e.g., RAID1, RAID5, RAID6, etc.). As will be explained in further detail shortly, the storage processing circuitry 30 (e.g., one or more storage processors, directors, blades, etc.) is constructed and arranged to perform probability-based allocation of physical storage from storage pools formed by the array of storage devices 32.

The communications medium (or fabric) 26 is constructed and arranged to connect the various components of the data storage environment 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

During operation, the host computers 22 send host I/O requests 42 (e.g., SCSI commands, file access commands, etc.) to the data storage system 24 through the communications medium 26. Such host I/O requests 42 write host data 44 to the data storage system 24 and read host data 44 from the data storage system 24.

Along these lines, the storage processing circuitry 30 makes host storage visible to the host computers 22 as thin pools (or LUNs, volumes, etc.) formed by thin devices (e.g., TDEVs). Tracks of the thin devices may be backed by actual storage from the storage pools. That is, such tracks of the thin devices may be mapped to actual tracks of physical storage.

As the host computers 22 write more host data 44, the storage processing circuitry 30 performs probability-based allocation (e.g., attempts to allocate storage from a first storage pool based on a first probability value and, if the attempt fails, from a second storage pool based on a second probability value, and so on). Such operation enables allocation of storage from more than one storage pool that is able to service an allocation request thus increasing overall write bandwidth (e.g., there is less opportunity to encounter an TO bottleneck to a particular storage pool). Furthermore, by using additional intelligence when determining the initial storage pool for allocation, the probability that the storage tracks will need to be moved to a different storage pool at a later time is reduced, resulting in better system performance. Further details will now be provided with reference to FIG. 2.

Figure 2:
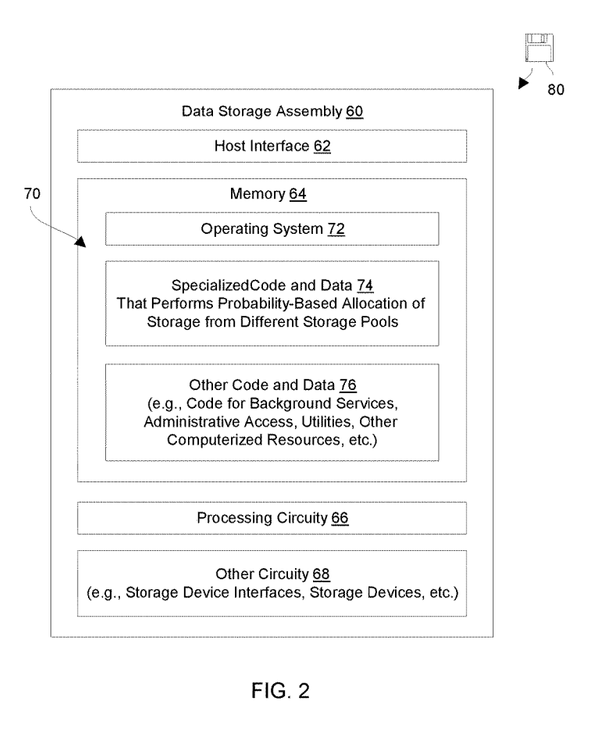
FIG. 2 is a block diagram of a data storage assembly which is suitable for use as data storage equipment in the data storage environment of FIG. 1.

FIG. 2 shows a data storage assembly 60 which is suitable for use as the data storage equipment 24 of the data storage environment 20 (also see FIG. 1). The data storage assembly 60 includes a host interface 62, memory 64, and processing circuitry 66, and other circuitry 68 (e.g., storage interfaces, storage devices, etc.).

The host interface 62 is constructed and arranged to connect the data storage assembly 60 to the communications medium 26 (also see FIG. 1) to enable electronic communications with other components of the data storage environment 20 (e.g., the host computers 22). Such communications may be SAN-based, IP-based, cellular-based, cable-based, fiber-optic based, wireless, cloud-based, combinations thereof, and so on. Accordingly, the communications interface 62 enables the data storage assembly 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized code and data 74 that performs probability-based allocation of storage, and other applications and data 76. The operating system 72 includes code such as a kernel to manage computerized resources (e.g., processor cycles, memory space, etc.), drivers (e.g., an I/O stack), and so on. The specialized code and data 74 provide for dynamic generation of probabilities in real-time, as well as allocation of storage based on these probabilities. The other applications and data 76 include applications and routines to provide other features (e.g., other background services, user-level applications, administrative tools, utilities, and so on).

The processing circuitry 66 is constructed and arranged to operate in accordance with the various software constructs 70 stored in the memory 64. As will be explained in further detail shortly, the processing circuitry 66 operates in accordance with the specialized code and data 74 to form specialized circuitry (e.g., see the storage processing circuitry 30 in FIG. 1) which allocate storages from storage pools to the host storage that is visible to the host computers 22. Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the data storage assembly 60. In particular, the computer program product 80 has a non-transitory (or non-volatile) computer readable medium which stores a set of instructions which controls one or more operations of the data storage assembly 60. Examples of suitable computer readable storage media include tangible articles of manufacture and apparatus which store instructions in a non-volatile manner such as flash memory, DVD, CD-ROM, disk memory, tape memory, and the like.

The other circuitry 68 represents other hardware of the data storage assembly 60 such as storage device interfaces, the storage devices 32 (also see FIG. 1), and so on. It should be understood that the storage devices 32 form different storage pools (or groups), each of which provides storage portions (e.g., tracks) that may be allocated to the visible host storage.

It should be understood that the processing circuitry 66, when operating in accordance with the software constructs 70 stored in the memory 64, forms specialized circuitry to perform probability-based allocation of storage. Additionally, such specialized circuitry performs other operations such as write operations, read operations, snapshots, backups, archiving, and other data storage services. Further details will now be provided with reference to FIG. 3.

Figure 3:
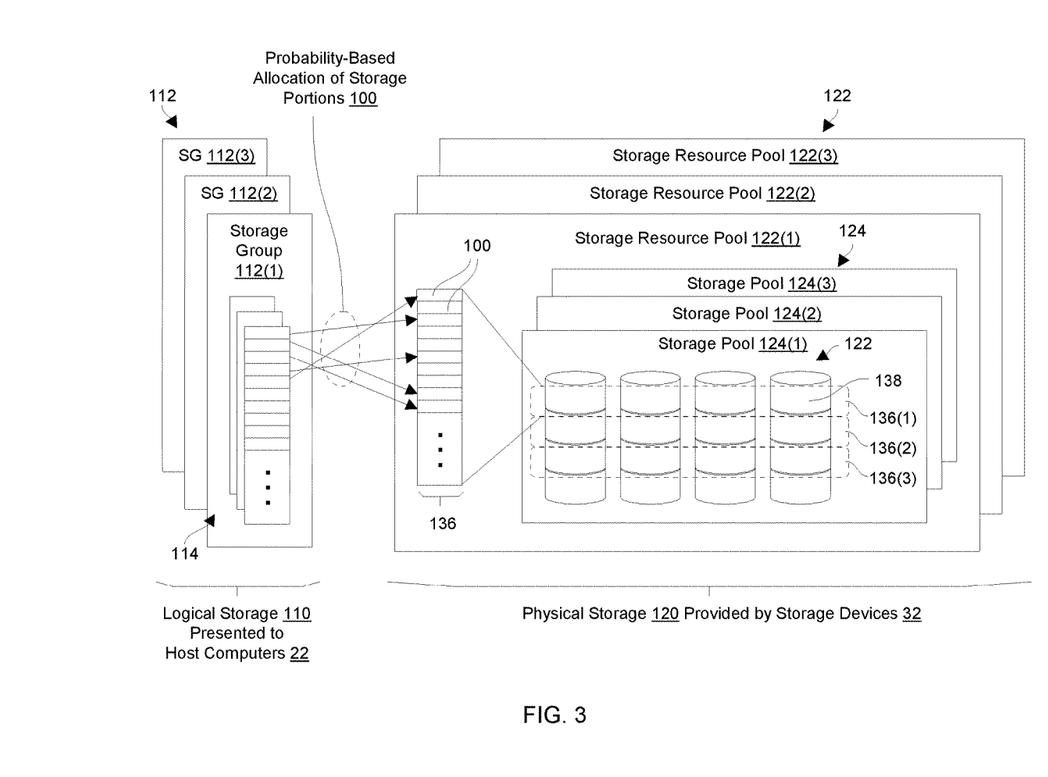
FIG. 3 is a block diagram illustrating particular storage details for probability-based allocation.

FIG. 3 shows details of storage portions 100 which the storage processing circuitry 30 (FIG. 1) allocates to host storage based on probabilities. In some arrangements, a storage portion 100 (or unit of allocation) is a track of a TDAT.

As shown in FIG. 3, the storage processing circuitry 30 (FIG. 1) presents, as host storage, logical storage 110 in the form of storage groups 112(1), 112(2), 112(3), . . . (collectively, storage groups 112) to the host computers 22. Each storage group 112 includes one or more thin devices 114 which are divided into thin device tracks. It should be understood that the logical storage 110 presented to the host computers 22 may be thinly provisioned where at least some of the thin device tracks do not map to actual physical storage 120. During operation, if there is a need for actual physical storage 120, the storage processing circuitry 30 allocates such physical storage 120 from the storage devices 32.

It should be understood that there is a one-to-one correspondence between the storage groups 112 and storage resource pools (SRPs) 122. That is, each storage group 112 is allocated storage portions 100 from a particular SRP 122. Along these lines, the storage group 112(1) is allocated storage portions 100 from the SRP 122(1), the storage group 112(2) is allocated storage portions 110 from the SRP 122(2), the storage group 112(3) is allocated storage portions 110 from the SRP 122(3), and so on.

Each SRP 122 includes one or more storage pools 124. For example, the SRP 122(1) is shown as including three storage pools 124(1), 124(2), 124(3). The physical storage devices 32 (FIG. 1) within each storage pool 124 are homogenous (i.e., use the same technology, have the same storage capacity, operate at the same rotational speed if applicable, and participate in providing the same RAID Level of data storage).

It should be understood that the storage processing circuitry 30 (FIG. 1) allocates the storage portions 100 as tracks or allocation units of individual data devices 136(1), 136(2), 136(3), . . . (e.g., collectively, data devices or TDATs 136). Each data device 136 is an aggregation of hypers 138 across multiple physical storage devices 32 configured as a RAID group that provides a particular RAID Level of data storage (e.g., RAID1, RAID5, RAID6, etc.).

It should be further understood that the physical storage devices 32 that provide the storage portions 110 to a particular storage group 112 reside in the same SRP 122 and do not provide physical storage 120 to any other storage group 112. Such separation provides a level of isolation/security, e.g., the physical storage devices 32 of a particular storage group 112 containing one entity's host data 44 can be removed from the data storage equipment 24 without removing another entity's host data 44, etc. Further details will now be provided with reference to FIG. 4.

Figure 4:
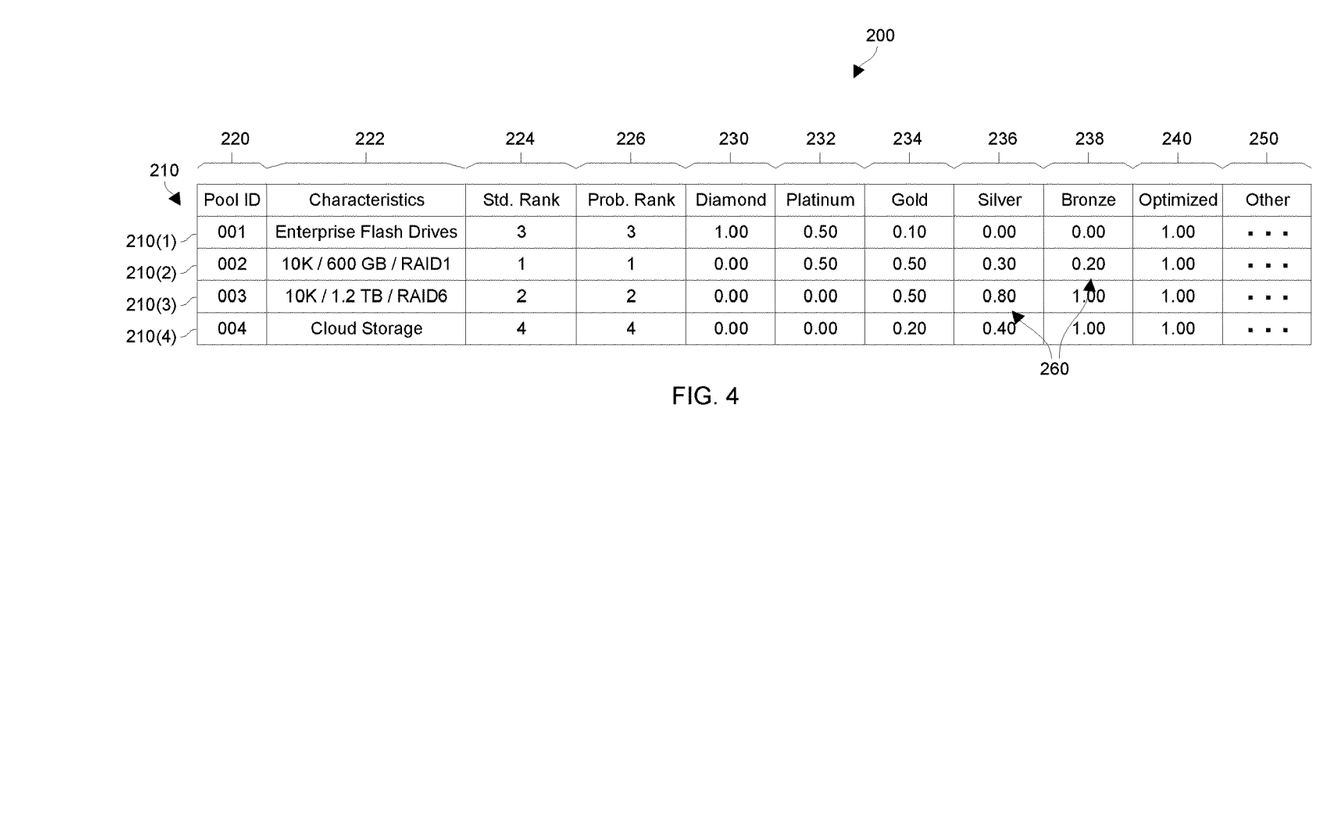
FIG. 4 is a block diagram illustrating particular details of probability-based allocation parameters which are maintained by the data storage equipment.

FIG. 4 shows particular details of allocation parameters 200 which are maintained by the data storage equipment 24 (also see the specialized code and data 74 in FIG. 2) for a particular SRP 122 (FIG. 3). The allocation parameters 200 may be arranged in the form of a database or table of entries 210(1), 210(2), 210(3), 210(4), . . . (collectively, entries 210). Each entry 210 corresponds to a different storage pool 124.

It should be understood that there are four storage pools 124 (i.e., storage pool 001, storage pool 002, storage pool 003, and storage pool 004) provided by way of example only. Other arrangements include more entries 210 if there are more storage pools 124, less entries 210 if there are less storage pools 124, etc.

Each entry 210 includes a storage pool identifier field 220, a characteristics (or description) field 222, a standard rank field 224, a probability rank field 226, a diamond probability field 230, a platinum probability field 232, a gold probability field 234, a silver probability field 236, a bronze probability field 238, an optimized probability field 240, and other fields 250. Such fields hold data which may be provided during initial configuration as well as updated during runtime.

The storage pool identifier field 220 of each entry 210 holds a pool identifier that uniquely identifies a particular storage pool 124 of the SRP 122. For example, "001" may identify a first storage pool 124 of enterprise flash drivers (EFDs), "002" may identify a second storage pool of 10K, 600 GB, RAID 1 magnetic disk drives, and so on.

The characteristics field 222 of each entry 210 holds descriptive characteristics for the particular storage pool 124 identified by the pool identifier in the pool identifier field 220 of that entry 210. In some arrangements, each storage pool 124 is unique in terms of the combination of technology, storage capacity, rotation speed (if applicable), and RAID Level.

The standard rank field 224 is a nonprobability-based allocation ranking (i.e., order) for the storage pools 124 of the SRP 122. The nonprobability-based allocation ranking is the order for the storage pools 124 that the storage processing circuitry 30 uses when attempting to allocate a storage portion 100 (e.g., a TDAT 136) when not allocating based on probabilities.

The probability rank field 226 is a probability-based allocation ranking (i.e., order) for the storage pools 124 of the SRP 122. The probability-based allocation ranking is the order for the storage pools 124 that the storage processing circuitry 30 uses when attempting to allocate a storage portion 100 (e.g., a TDAT 136) when allocating based on probabilities. By way of example, the probability-based allocation ranking for the current SRP 122 is the same as the nonprobability-based allocation ranking for the current SRP 122, although this is not required.

The diamond probability field 230 holds a probability value 260 between 0.00 (representing 0%) and 1.00 (representing 100%), inclusive, for a "Diamond" service level objective (SLO). As will be discussed shortly, each probability value 260 can be updated dynamically by the storage processing circuitry 30 during data storage equipment operation. By way of example, the probability value for an EFD storage portion 100 from storage pool 001 is 1.00 for the "Diamond" SLO. Additionally, the probability value for a storage portion 100 from storage pool 002 (i.e., 10K, 600 GB, RAID1) is 0.00 for the "diamond" SLO, and so on.

Similarly, the platinum probability field 232 holds a probability value 260 between 0.00 (representing 0%) and 1.00 (representing 100%), inclusive, for a "Platinum" SLO. By way of example, the probability value for an EFD storage portion 100 is 0.50 for the "Platinum" SLO. Additionally, the probability value for a "10K, 600 GB, RAID1" storage portion 100 is 0.50 for the "Platinum" SLO, and so on.

Likewise, the gold probability field 234 holds a probability value 260 between 0.00 (representing 0%) and 1.00 (representing 100%), inclusive, for a "Gold" SLO. By way of example, the probability value for an EFD storage portion 100 is 0.50 for the "Gold" SLO. Additionally, the probability value for a "10K, 600 GB, RAID1" storage portion 100 is 0.50 for the "Gold" SLO, and so on.

Additionally, the silver probability field 236 holds a probability value 260 between 0.00 (representing 0%) and 1 (representing 100%), inclusive, for a "Silver" SLO. By way of example, the probability value for an EFD storage portion 100 is 0.00 for the "Silver" SLO. Also, the probability value for a "10K, 600 GB, RAID1" storage portion 100 is 0.30 for the "Silver" SLO, and so on.

Furthermore, the bronze probability field 238 holds a probability value 260 between 0.00 (representing 0%) and 1.00 (representing 100%), inclusive, for a "Bronze" SLO. By way of example, the probability value for an EFD storage portion 100 is 0.00 for the "Bronze" SLO. Also, the probability value for a "10K, 600 GB, RAID1" storage portion 100 is 0.20 for the "Bronze" SLO, and so on.

Additionally, the optimized probability field 238 holds a probability value 260 between 0.00 (representing 0%) and 1.00 (representing 100%), inclusive, for an "Optimized" SLO. By way of example, the probability value for an EFD storage portion 100 is 1.00 for the "Optimized" SLO. Also, the probability value for a "10K, 600 GB, RAID1" storage portion 100 is 1.00 for the "Optimized" SLO, and so on.

It should be understood that the SLOs "Diamond, "Platinum", "Gold", "Silver", "Bronze", and "Optimized" are provided by way of example only. Such SLOs are selectable by the operator of the data storage equipment 24. In other arrangements, there are more SLOs, less SLOs, different SLOs, and so on.

It should be further understood that the entries 210 may include other data for the various storage pools 124 of the SRP 124. For example, such data may include the percentage of the storage pool 124 that is currently in use, a current service level expectation state, etc. Additionally, such data may include a current SLO state for each storage pool 124 such as exceeding the SLO, meeting the SLO, or missing the SLO. Furthermore, such data may include scoring data that defines lower level operating states (e.g., algorithmically derived scores based on current response times, and so on). In some arrangements, these parameters are used to identify individual probabilities, and the particular probabilities that are entered into the fields of the database are the minimums of these probabilities.

During operation, the storage processing circuitry 30 receives requests to allocate a storage portion 100 from an SRP 122 (e.g., in response to the need for additional storage to store host data 44). In response to each allocation request, the storage processing circuitry 30 performs a set of probability-based allocation attempts which attempts to allocate a storage portion 100 from one of the plurality of storage pools 124 of the SRP 122. Further details will be provided via the following example.

Suppose that the operator of the data storage equipment 24 has selected the "Silver" service level objective (SLO) (also see the column identified by reference numeral 236 in FIG. 4). By way of example, there are four storage pools 210 which are ranked, based on the contents of the ranking fields 226 of the entries 210, in the following order: storage pool 002, storage pool 003, storage pool 001, and storage pool 004 (also see the column identified by reference numeral 226 in FIG. 4). This ordering is referred to as the probability-based allocation ranking for the SRP 122.

Further suppose that the storage processing circuitry 30 of the data storage equipment 24 receives an allocation request to add a storage portion 100 (or an allocation unit, also see FIG. 3). For example, the storage processing circuitry 30 may need to allocate more physical storage to hold more host data 44.

In response to the allocation request, the storage processing circuitry 30 generates an initial random probability value. Although other approaches are suitable for use as well, in the context of percentages where 0.00 represents 0% and 1.00 represents 100%, the storage processing circuitry 30 generates an initial random value between 0.00 and 1.00, inclusive. For example, suppose that the storage processing circuitry 30 generates 0.67 as the initial random probability value.

Next, the storage processing circuitry 30 compares this random probability value to the probability value for the first ranked storage pool 124 under the "Silver" SLO. As shown in FIG. 4, the first ranked storage pool 124 is the pool identified by the entry 210(2) (i.e., identified as storage pool 002). Accordingly, the storage processing circuitry 30 reads the probability for the "Silver" SLO for that storage pool which is 0.30. The storage processing circuitry 30 then compares the generated random probability value of 0.67 to 0.30. Since the generated random probability value of 0.67 is higher than 0.30, the storage processing circuitry 30 does not attempt to allocate a storage portion 100 from storage pool 002. Rather, the storage processing circuitry 30 repeats the above-described process for the next storage pool 124 in the ranking.

In particular, the storage processing circuitry 30 generates another random probability value. For example, suppose that the storage processing circuitry 30 generates 0.43 as the next random probability value.

Then, the storage processing circuitry 30 compares this random probability value to the probability value for the second ranked storage pool 124 under the "Silver" SLO. As shown in FIG. 4, the second ranked storage pool 124 is the pool identified by the entry 210(3) (i.e., identified as storage pool 003). Accordingly, the storage processing circuitry 30 reads the probability for the "Silver" SLO for that storage pool which is 0.80. The storage processing circuitry 30 then compares the generated random probability value of 0.43 to 0.80. Since the generated random probability value of 0.43 is lower than 0.80, the storage processing circuitry 30 attempts to allocate a storage portion 100 from storage pool 003. If the allocation attempt is successful, the storage processing circuitry 30 then provisions the host storage with the storage portion 100. Otherwise, the storage processing circuitry 30 repeats the above-described process for the next storage pool 124 in the ranking, and so on.

It should be understood that it is possible that the second allocation attempt may fail. For example, in the current example, when the storage processing circuitry 30 tries to allocate a storage portion 100 from the storage pool 003, the storage processing circuitry 30 may determine that the storage pool 003 is completely full and there are no storage portions 100 available for allocation. In such a situation, the storage processing circuitry 30 performs the above-described probability-based operation regarding the next storage pool (i.e., the storage pool 001).

It should be further understood that it is possible that the storage processing circuitry 30 may go through the entire probability-based allocation ranking and not have successfully allocated a storage portion 100 to satisfy the allocation request. It this situation occurs, the storage processing circuitry 30 then goes through a set of nonprobability-based allocation attempt operations using the nonprobability-based allocation ranking (also see the column identified by reference numeral 224 in FIG. 4). Here, the storage processing circuitry 30 sees that the nonprobability-based allocation ranking provides the following order: storage pool 002, storage pool 003, storage pool 001, and storage pool 004.

Accordingly, the storage processing circuitry 30 tries to allocate a storage portion 100 from the storage pool 002, identified by the storage pool entry 210(2), regardless of any probabilities. If the allocation attempt is successful, the storage processing circuitry 30 then provisions the host storage with the storage portion 100 from the storage pool 002. Otherwise, the storage processing circuitry 30 continues through the nonprobability-based allocation ranking attempting to allocate a storage portion 100 form each storage pool 124 in that order.

It should be understood that, in the above-identified example, the storage processing circuitry 30 initially did not attempt an allocation from the storage pool 002 when going through the probability-based allocation ranking since the generated random probability value was higher than the probability for that storage pool 002. However, under the nonprobability-based allocation ranking, the storage processing circuitry 30 performs an allocation attempt.

One should appreciate that the above-described methodology of attempting to allocate storage portions 100 based on probabilities enables the storage processing circuitry 30 to attempt allocations from other storage pools 124 that are able to service an allocation request. Such spreading of allocation attempts across available storage pools 124 results in a wider distribution of host data 44 among the storage pools 124 of the SRP 122. Accordingly, there is increased IO bandwidth available for the SRP 122 (i.e., less likelihood of a particular storage pool 124 of the SRP 122 becoming a bottleneck while other storage pools 124 of the SRP 122 are less busy). Moreover, the overall performance of the SRP improves thus requiring less data movement in the long run to maintain healthy SLO performance. Further details will now be provided with reference to FIG. 5.

Figure 5:
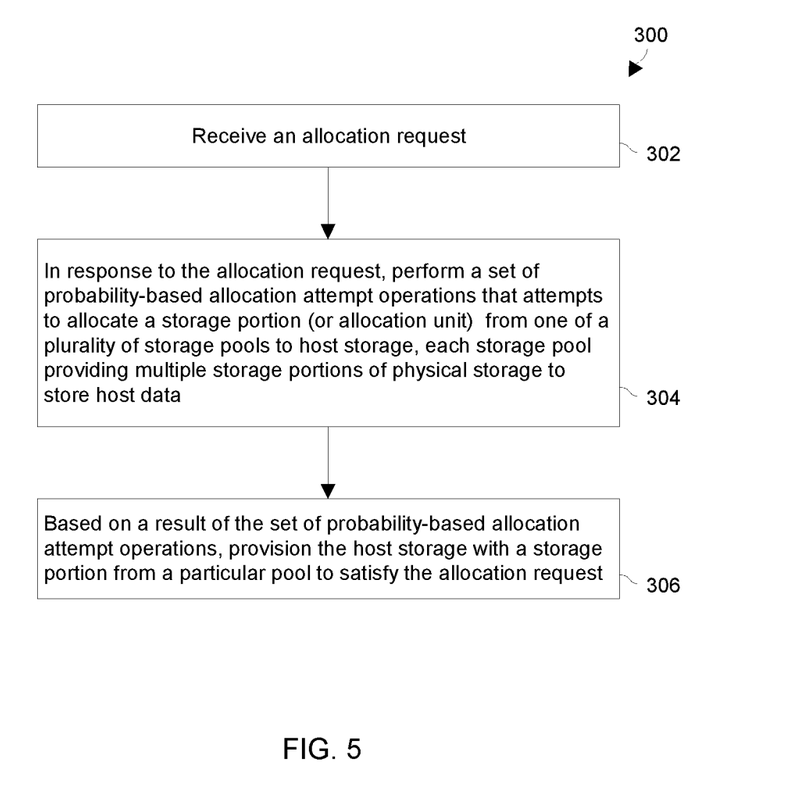
FIG. 5 is a flowchart of a procedure which is performed by the data storage equipment.

FIG. 5 is a flowchart of a procedure 300 which is performed by the storage processing circuitry 30 of the data storage equipment 24 to allocate storage from a plurality of storage pools to host storage. Such a procedure provides better system performance since the probability of needing to move host data to a different pool at a later time is reduced.

At 302, the storage processing circuitry 30 receives an allocation request. Here, the storage processing circuitry 30 determines that there is a need to provide back-end physical storage to a thin device (also see FIG. 3).

At 304, in response to the allocation request, the storage processing circuitry 30 performs a set of probability-based allocation attempt operations that attempts to allocate a storage portion (or allocation unit) from one of the plurality of storage pools to the host storage. Each storage pool of the plurality of storage pools offers multiple storage portions of physical storage to store host data.

At 306, the storage processing circuitry 30 provisions, based on a result of the set of probability-based allocation attempt operations, the host storage with a storage portion from a particular pool of the plurality of storage pools to satisfy the allocation request.

Such operation involves mapping and providing ownership of a storage portion to a thin device of visible host storage. Such operation helps steer host data to locations that require less correction in the end (e.g., reducing the need to later move the data to a different location to satisfy certain metrics such as SLOs).

As described above, improved techniques are directed to allocating storage from different storage pools 124 using dynamic probabilities 260. Here, for each allocation request, data storage circuitry 30 performs a set of probability-based allocation attempt operations that attempt to allocate storage from one of the storage pools 124. Along these lines, the data storage circuitry 30 assigns each storage pool 124 a probability at runtime. The data storage circuitry 30 then attempts to allocate storage from the storage pools 124 based on the probabilities 260 (e.g., an attempt to allocate storage from a first storage pool based on a first probability 260 and, if the attempt fails, from a second storage pool based on a second probability 260, and so on). Such operation enables more storage pools 124 to participate in allocation thus increasing overall write bandwidth. Moreover, such operation reduces data movement in the long run (e.g., the process of moving host data 44 among the storage pools 124 to maintain performance objectives).

One should appreciate that the above-described techniques do not merely assign storage to data. Rather, the disclosed techniques involve an improvement to the technology of data storage. With the above-described techniques, data is stored in locations that result in less data movement in the long run. Other advantages are available as well such as improved IO bandwidth, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the storage pool 004 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

In terms of the earlier provided parameters 200 (FIG. 4), it should be understood that the data storage equipment 24 may begin with a preconfigured probability table, i.e., a table of overall probabilities predefined by the manufacturer. Then, over time, the data storage equipment 24 may update the overall probabilities in the probability table via a background process or service. The background process may address the most critical overall probabilities (i.e., where a particular pool is struggling to keep up with demands) ahead of the other overall probabilities.

For a particular overall probability identified by Pool# and Service Level (SL), the Overall_Probability may be the minimum of an SRP_Probability and an SLO_Probability:

Overall_Probability=Minimum(SRP_Probability, SLO_Probability).

The SRP_Probability may be based on (i) the amount of free space remaining in the Pool# and (ii) the current performance of the Pool#. Free space (or % Used) may change over time as the pools fill with data. Similarly, performance (ResponseTime) may change over time as the pools fill and due to the amount of IO at any particular time. In particular, the SRP_Probability is the minimum of a % Used probability and a ResponseTime probability:

$$SRP\_Probability_{Pool\#}=Minimum(\% \ Used_{Pool\#}, ResponseTime_{Pool\#}).$$

Here, the $SRP\_Probability_{Pool\#}$ gives the data storage equipment 24 the opportunity to decline (or say "no") by lowering the $SRP\_Probability_{Pool\#}$ based on % Used and/or ResponseTime.

The SLO_Probability may be based on a current state and a current service level. The current state (e.g., exceeding, meeting, or missing) may be determined algorithmically (e.g., based a scoring system that weights reads heavier than writes since writes may be less of an issue by initially going to cache memory). The current service level (e.g., diamond, platinum, etc.) may be selected by the customer (e.g., based on needs of an application).

By using additional intelligence when determining the initial pool for allocation, the probability that the storage tracks will need to be moved to a different pool at a later time is reduced, resulting in better system performance. Such modifications and enhancements are intended to belong to various embodiments of the disclosure.

What is claimed is:

1. In a data storage assembly, a method of allocating storage from a plurality of storage pools to host storage, the method comprising:
   receiving an allocation request;
   in response to the allocation request, performing a set of probability-based allocation attempt operations that attempts to allocate a storage portion from one of the plurality of storage pools to the host storage, each storage pool of the plurality of storage pools providing multiple storage portions of physical storage to store host data; and
   based on a result of the set of probability-based allocation attempt operations, provisioning the host storage with a storage portion from a particular pool of the plurality of storage pools to satisfy the allocation request;
   wherein performing the set of probability-based allocation attempt operations includes:
   generating an initial random probability value,
   performing an initial comparison operation that compares the initial random probability value to a probability threshold assigned to an initially selected storage pool of the plurality of storage pools, and
   performing a follow-up activity in response to a result of the initial comparison operation, the follow-up activity (i) including an attempt to allocate a storage portion from the initially selected storage pool when the result of the initial comparison operation indicates that the initial random probability value is below the probability threshold assigned to the initially selected storage pool, and (ii) not including an attempt to allocate the storage portion from the initially selected storage pool when the result of the initial comparison operation indicates that the initial random probability value is above the probability threshold assigned to the initially selected storage pool.

2. A method as in claim 1 wherein performing the set of probability-based allocation attempt operations further includes:
   in response to no storage portion being allocated from the initially selected storage pool, generating a second random probability value,
   performing a second comparison operation that compares the second random probability value to a probability threshold assigned to a second selected storage pool of the plurality of storage pools, and
   performing a second follow-up activity in response to a result of the second comparison operation, the second follow-up activity (i) including an attempt to allocate a storage portion from the second selected storage pool when the result of the second comparison operation indicates that the second random probability value is below the probability threshold assigned to the second selected storage pool, and (ii) not including an attempt to allocate the storage portion from the second selected storage pool when the result of the second comparison operation indicates that the second random probability value is above the probability threshold assigned to the second selected storage pool.

3. A method as in claim 2 wherein the second random probability value is generated in response to a failed attempt to allocate a storage portion from the initially selected storage pool.

4. A method as in claim 2 wherein the second random probability value is generated in response the initial random probability value being above the probability threshold assigned to the initially selected storage pool.

5. A method as in claim 2, further comprising:
   prior to receiving the allocation request, providing a ranking that ranks the storage pools of plurality of storage pools in a predefined order, the initially selected storage pool being ranked ahead of the second selected storage pool.

6. A method as in claim 2 wherein performing the set of probability-based allocation attempt operations further includes:
   prior to performing the initial comparison operation and based on the ranking, selecting a first storage pool from the plurality of storage pools as the initially selected storage pool, and
   in response to no storage portion being allocated from the initially selected storage pool and based on the ranking, selecting a second storage pool from the plurality of storage pools as the second selected storage pool, the second storage pool being different from the first storage pool.

7. A method as in claim 2, further comprising:
   prior to receiving the allocation request, providing a set of probability thresholds, each probability threshold being assigned to a respective storage pool of the plurality of storage pools.

8. A method as in claim 5 wherein each random probability value is a number between 0 and 1, inclusive; and
   wherein providing the set of probability thresholds includes:
   assigning a first probability threshold between 0 and 1, inclusive, to the initially selected storage pool, and
   assigning a second probability threshold between 0 and 1, inclusive, to the second selected storage pool.

9. A method as in claim 8, further comprising:
   routinely updating the set of probability thresholds based on real-time system information.

10. A method as in claim 9 wherein routinely updating the set of probability thresholds based on the real-time system information includes:

deriving each probability threshold of the set of probability thresholds based on a service level objective (SLO) selection assigned to the data storage assembly, the SLO selection having been selected from performance-differentiated SLO selections offered by the data storage assembly.

11. A method as in claim 9 wherein routinely updating the set of probability thresholds based on the real-time system information includes:

deriving each probability threshold of the set of probability thresholds based on a storage resource pool (SRP) parameter corresponding to a respective storage pool of the plurality of storage pools.

12. A method as in claim 11 wherein the SRP parameter corresponding to the respective storage pool of the plurality of storage pools is a measure of percentage used of that respective storage pool.

13. A method as in claim 11 wherein the SRP parameter corresponding to the respective storage pool of the plurality of storage pools is a health state of that respective storage pool.

14. A method as in claim 9 wherein routinely updating the set of probability thresholds based on the real-time system information includes:

deriving each probability threshold of the set of probability thresholds based on (i) a service level objective (SLO) selection assigned to the data storage assembly, the SLO selection having been selected from performance-differentiated SLO selections offered by the data storage assembly, (ii) a measure of percentage used of that respective storage pool, and (iii) a health state of that respective storage pool.

15. A method as in claim 2 wherein no storage portion is allocated after performing the set of probability-based allocation attempt operations; and wherein the method further comprises:

providing another ranking that ranks the storage pools of plurality of storage pools in another predefined order, and in response to no storage portion is allocated after performing the set of probability-based allocation attempt operations and based on the other ranking, performing a set of nonprobability-based allocation attempt operations that attempts to allocate a storage portion from one of the plurality of storage pools to the host storage.

16. A data storage assembly that allocates storage from a plurality of storage pools to host storage, comprising:

a set of physical storage devices that provides a plurality of storage pools;

memory; and control circuitry coupled to the memory and the set of physical storage devices, the memory storing instructions which, when carried out by the control circuitry, cause the control circuitry to:

receive an allocation request;

in response to the allocation request, perform a set of probability-based allocation attempt operations that attempts to allocate a storage portion from one of the plurality of storage pools to the host storage, each storage pool of the plurality of storage pools providing multiple storage portions of physical storage to store host data; and based on a result of the set of probability-based allocation attempt operations, provision the host storage with a storage portion from a particular pool of the plurality of storage pools to satisfy the allocation request wherein the control circuitry, when performing the set of probability-based allocation attempt operations, is constructed and arranged to:

generate an initial random probability value, perform an initial comparison operation that compares the initial random probability value to a probability threshold assigned to an initially selected storage pool of the plurality of storage pools, and perform a follow-up activity in response to a result of the initial comparison operation, the follow-up activity (i) including an attempt to allocate a storage portion from the initially selected storage pool when the result of the initial comparison operation indicates that the initial random probability value is below the probability threshold assigned to the initially selected storage pool, and (ii) not including an attempt to allocate the storage portion from the initially selected storage pool when the result of the initial comparison operation indicates that the initial random probability value is above the probability threshold assigned to the initially selected storage pool.

17. A computer program product having a non-transitory computer readable medium which stores a set of instructions to allocate storage from a plurality of storage pools to host storage; the set of instructions, when carried out by computerized circuitry, causing the computerized circuitry to perform a method of:

receiving an allocation request;

in response to the allocation request, performing a set of probability-based allocation attempt operations that attempts to allocate a storage portion from one of the plurality of storage pools to the host storage, each storage pool of the plurality of storage pools providing multiple storage portions of physical storage to store host data; and based on a result of the set of probability-based allocation attempt operations, provisioning the host storage with a storage portion from a particular pool of the plurality of storage pools to satisfy the allocation request wherein performing the set of probability-based allocation attempt operations includes:

generating an initial random probability value, performing an initial comparison operation that compares the initial random probability value to a probability threshold assigned to an initially selected storage pool of the plurality of storage pools, and performing a follow-up activity in response to a result of the initial comparison operation, the follow-up activity (i) including an attempt to allocate a storage portion from the initially selected storage pool when the result of the initial comparison operation indicates that the initial random probability value is below the probability threshold assigned to the initially selected storage pool, and (ii) not including an attempt to allocate the storage portion from the initially selected storage pool when the result of the initial comparison operation indicates that the initial random probability value is above the probability threshold assigned to the initially selected storage pool.

18. A method as in claim 1, further comprising:

prior to provisioning the host storage with the storage portion from the particular pool, (i) forming a plurality of data devices from the particular pool, each data device including an aggregation of hypers from a common set of physical storage devices, and (ii) dividing a particular data device of the plurality of data devices into a plurality of storage portions which includes the storage portion from the particular pool.

19. A method as in claim 18 wherein the host storage includes a storage group having a set of thin devices which is accessible by a host computer;

wherein the allocation request is received in response to the host computer attempting to access a particular thin device of the set of thin devices; and wherein the method further comprises:

after dividing the particular data device into the plurality of storage portions and prior to provisioning the host storage with the storage portion from the particular pool, creating a correspondence that maps the particular thin device to the particular data device.

20. A method as in claim 19, further comprising:

maintaining a plurality of map entries that maps a plurality of thin device tracks of the particular thin device to the plurality of storage portions to support input/output (I/O) requests accessing the thin device tracks from the host computer.

* * * * *